United States Patent [19]

Noddings et al.

[11] 4,140,202
[45] Feb. 20, 1979

[54] SPEED RESPONSIVE SYSTEMS

[75] Inventors: John Noddings; Roland K. Borton, both of Leamington Spa, England

[73] Assignee: Associated Engineering Limited, Leamington Spa, England

[21] Appl. No.: 806,621

[22] Filed: Jun. 15, 1977

[30] Foreign Application Priority Data

Jun. 24, 1976 [GB] United Kingdom ............... 26400/76

[51] Int. Cl.² .............................................. B60K 31/00
[52] U.S. Cl. ................................. 180/105 E; 123/102
[58] Field of Search ...................... 180/105 E; 123/102

[56] References Cited

U.S. PATENT DOCUMENTS

| 3,570,622 | 12/1968 | Wisner | 180/105 E |
| 3,705,639 | 12/1972 | Colling et al. | 180/105 E |
| 3,983,954 | 10/1976 | Noddings et al. | 180/105 E |

Primary Examiner—Joseph F. Peters, Jr.
Assistant Examiner—Donn McGiehan

[57] ABSTRACT

In an electronic speed responsive system for a motor vehicle, a first voltage proportional to an actual speed of the vehicle is compared with a reference voltage representing a desired cruise speed in order to produce an output error signal related to the difference between said first voltage and said reference voltage, the desired cruise speed is stored in a memory, and a control logic and safety circuit for rendering the system operative and inoperative has a memory cancel facility which cancels the previously memorized cruise speed stored in the memory when a driver of the vehicle makes an action associated with bringing the vehicle into, or preparatory to driving the vehicle from, a parked condition.

12 Claims, 1 Drawing Figure

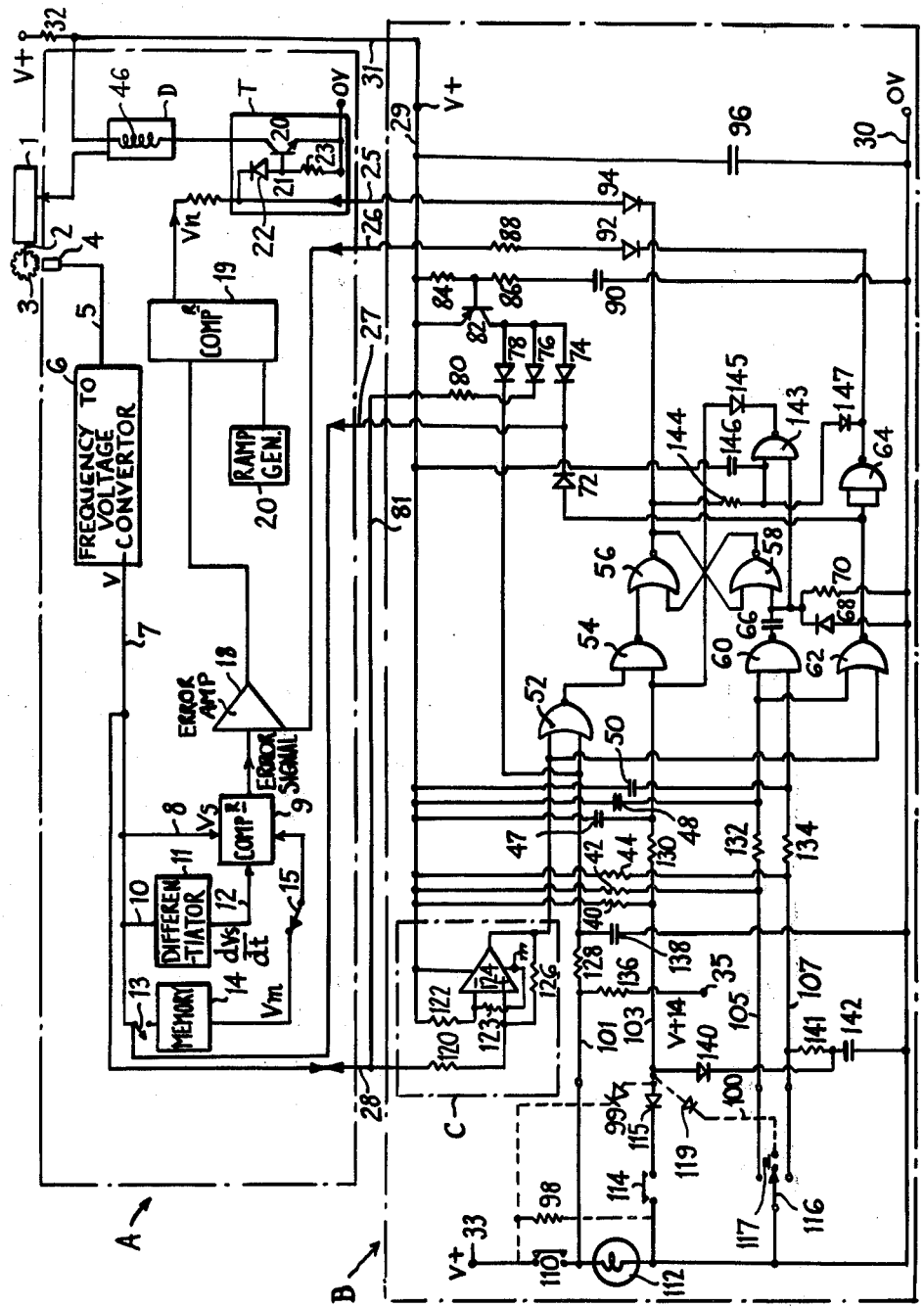

SPEED RESPONSIVE SYSTEMS

This invention relates to speed responsive systems and particularly to speed-responsive systems for motor vehicles, which enable the vehicle to be maintained at a predetermined speed.

It is an object of the invention to provide control means for such a speed responsive system and in particular but not exclusively for a system comprising means for generating a first voltage which changes with the rotational speed of a rotatable member, and a second voltage which is dependent on the rate of change of the first voltage, means for generating a reference voltage, first comparator means for combining the first and second voltages with the reference voltage, said first comparator means being arranged to change its output signal dependent upon the relative magnitude of said first voltage, said second voltage and said reference voltage, and said output signal being fed to second comparator means for comparison with a periodic voltage of constant frequency so as to produce at the output of said second comparator means a train of pulses of constant frequency and of a width varying with relative magnitude of said first voltage, said second voltage, and said reference voltage.

According to the present invention, in one aspect, the control means comprises electronic circuitry to render the reference voltage inoperative when making an action associated with bringing the vehicle into, or preparatory to driving the vehicle from, a parked condition.

For example, this parked condition may be determined by the action of switching-off the engine or equivalent operation in the case of a diesel-engine vehicle and the action preparatory to driving the vehicle may be switching-on the engine or equivalent operation in the case of a diesel-engine vehicle. Alternatively, the action may be the application or release of a vehicle hand brake, but the invention comprehends the use of other suitable actions.

Thus, in a case where the speed control was set to 70 mph while the vehicle was travelling on a motorway and the driver left the motorway and parked the vehicle, thereby switching the engine off, the invention enables the car to be driven away from the parked condition such that when the vehicle exceeds a lock-out speed of say 20 mph, the speed control circuit would not automatically engage at the pre-set memory level of 70 mph.

According to the present invention, in another aspect, the control means includes electronic circuitry comprising first switch means which, when momentarily operated, causes engagement of a speed control circuit and memorizing of the vehicle cruise speed and which, when held in, causes increase of the vehicle speed and simultaneous updating of the memory voltage, and second switch means which, if operated when the system is on, causes it to be switched off, and which if operated when the system is off causes the control circuit to resume operation at the previously memorized speed.

According to a feature of a preferred embodiment, the first and second switch means initiate pulses to operate control logic elements of the electronic circuitry whilst circuit lock-out means are direct coupled. This gives a safety advantage in that even if these switches become shorted to the on condition due to failure of some component, once the speed responsive circuit has been over-ridden it will remain so. The electronic circuitry preferably is constituted by a control logic and safety circuit providing speed responsive system lock-out to standby condition at supply switch-on, memory cancel at supply switch-on, low speed lock-out to standby condition, engage speed control system and memorize cruise speed, advance of cruise speed manually, speed responsive system lock-out to standby condition when the vehicle is braked, and/or when neutral gear is engaged, and/or when the clutch is depressed, and/or when top gear is not selected, and/or manually, and resume cruise speed, after lock-out other than that caused by supply switch-on, and switch-off to standby when cruising.

The reference voltage may be preset in an electrical memory circuit which may be either an analogue or a digital memory.

According to the present invention, in a further aspect, the control means includes electronic circuitry comprising a driver-operated multi-position switch which causes in one of its positions engagement of the speed control circuit and memorizing of the vehicle cruise speed; and in another of its positions, which when the system is off, causes the control circuit to resume operation at the previously memorized cruise speed, and in each of said positions when the system is on the switch causes the system to be switched off to a standby condition, said multiposition switch preferably being connected to speed control circuit lock-out means via selected logic elements of the electronic circuitry such that in each of said positions, the switch initiates a pulse to operate selected ones of said logic elements through a respective logic input. Preferably the multipurpose switch has a further position in which it initiates a pulse to operate selected logic elements of the electronic circuitry through a further logic input when the system is on to cause the system to be switched off to a standby condition.

Thus, whichever position the driver operated switch is moved into when the system is on will cause lock-out of the speed control circuit to a standby condition. Accordingly, there is no need for the driver to select a lock-out position thereby providing an additional safety factor.

The invention will be further described, by way of example, with reference to the accompanying drawing, which is a circuit diagram of one embodiment of an electronic speed-responsive system, constructed in accordance with this invention.

Referring to the drawing, the speed responsive system comprises a seed responsive circuit A and a control logic and safety circuit B. A vehicle power unit 1 includes the usual engine and gearbox and drives an output shaft 2 to which is fastened a ferrous-toothed disc or wheel 3. Adjacent the toothed wheel is an inductive transducer 4 of the kind which emits an electrical pulse as each tooth on the wheel 3 passes the transducer. Each pulse is fed into circuit A along a line 5 which feeds a frequency-to-voltage converter circuit 6 which in turn emits an electrical feedback signal V (which is proportional to pulse frequency) along a line 7. The signal V in line 7 is fed by a line 8 as one input Vs to a comparator 9. The signal V is also fed by a line 10 to a differentiator 11 whose output signal dVs/dt is proportional to the rate of change of signal V and is fed by a line 12 as a further input to the comparator 9.

In addition, the signal V is fed through a set-memory switch 13 to an electrical memory circuit 14 which may either be an analogue or a digital memory. The circuit 14 maintains an output signal which is equal to the value which is signal V had, when the switch 13 was momentarily closed. The output signal of memory circuit 14 is fed as a third input signal Vm into the comparator 9 through a switch 15.

The comparator 9 processes the three signal which are fed to it and produces an error signal which is fed to an error amplifier 18, the output of which is connected to one input terminal of a further comparator 19. A ramp generator 20, generating a ramp pulse frequency of between 10 to 50 Hz, typically 20 Hz, is connected to the other input terminal of the comparator 19. The comparator 19 compares the ramp and error signals so as to produce a drive output signal Vn in the form of a plurality of substantially constant-frequency pulses, whose mark/space ratio varies in dependence upon the magnitude of the error signal.

The signal Vn is fed to one terminal of a solenoid winding 46 of an electromagnetic valve of a vehicle throttle actuator device D; which the drive signal Vn operates via a driver transistor 20 in a transistor circuit T and which enables the circuit described to control the vehicle power unit 1 so as to maintain a vehicle at a predetermined desired speed. The other terminal of the winding 46 is connected to V+ of the vehicle supply. The base circuit 21 of the transistor 20 conveniently includes, as shown, a zener diode 22 and a resistance 23 for a purpose to be described. The actuator device conveniently comprises a chamber partly bounded by a movable wall and connected to atmosphere through a permanently open orifice, the electromagnetic valve being maintained in a closed position when its winding is de-energized and controlling the connection to the chamber of a pressure of gas at other than atmospheric pressure when the valve is open, e.g. from the engine air inlet manifold.

In use, a vehicle driver takes his vehicle up to a speed, for example 50 mph, which he wishes to maintain constant. He then operates a control to open switch 13 and thereby sets and stores the desired constant speed in the memory 14. This switching also causes the comparator 19 to emit pulses to the electromagnetic valve. At this time, the signal Vm from memory 14 is equal to the feedback signal Vs applied to the comparator 9, so that the error signal fed to comparator 19 through the error amplifier 18 is set at a position corresponding approximately with the mid-position of the amplitude excursion of the ramp signal. Accordingly the mark/space ratio of the output pulses from comparator 19 is approximately unity. These pulses of unit mark/space ratio cause the electromagnetic valve of the actuator device to move up and down so as to allow pulses of reduced gas pressure from the air inlet manifold of the vehicle engine to enter the chamber of actuator device and move it to a position which will hold the engine throttle of the vehicle at some opening. Although the electromagnetic valve responds to the individual electrical pulses, the actuator device only responds to the integrated change in gas pressure within its chamber which is caused by these pulses. If this throttle opening is insufficient to maintain the desired speed, the vehicle speed will drop thereby causing the error signal fed to comparator 19 to change to a value or level which is such as to give a wider pulse width, which in turn will control the actuator device to move the engine throttle to an opening which will maintain the desired speed. Similarly, if the engine throttle opening is too high to maintain the desired speed, the circuit will cause the error signal to change in value or level so as to produce smaller pulse widths from comparator 19 which in turn will control the actuator device so as to move the engine throttle to a smaller opening.

If, the vehicle speed changes from 50 mph., for example due to a gradient, an unbalanced error signal is again produced. If for example the vehicle is going down an incline and the speed rises beyond 50 mph., the error signal will change in value or level to give smaller pulse widths until in the limit it is less than the ramp signal, so that no pulses are fed to the electromagnetic valve, thus causing part closure of the throttle. This reduces the quantity of fuel available to the engine so that the vehicle speed falls to 50 mph.

Similarly, if for example the vehicle is travelling up an incline and the speed falls below 50 mph., the error signal will change in value or level to give greater pulse widths until at the limit it is greater than the ramp signal thus producing pulses of infinite mark/space ratio which operate the actuator to cause an increase in the quantity of fuel available to the engine so that the vehicle speed rises to 50 mph. Between the two above limits, pulses of variable mark/space ratio are produced when the error signal lies between the amplitudes of excursion of the ramp signal.

In order for the speed responsive circuit A to be rendered operative and inoperative, the speed responsive system also comprises a control logic and safety circuit B which is connected to the circuit A through lines 25 to 28. The circuit B has supply rails 29 and 30 at V+ and 0v volts respectively, the supply rail 29 being connected through a line 31 and resister 32 to V+ of the vehicle supply. The circuit B also has connections at 33 and 35 to the V+ supply and to a V+ 14 volts supply respectively, the connection 35 being made through a resistor 136.

The control logic of circuit B is operated by the brake lamp switch 110, neutral gear/clutch/top gear/manual over-ride switches 114 and engage/advance and resume/off switch(es) 116. The engage/advance and resume/off switches, together with a manual lock-out switch 117 (to be described later) may be either combined in one multi-purpose switch, arranged for convenient operation by the driver, for example on the vehicle facia, or be separate momentary-operation switches of the spring-biassed or push-button type similarly arranged for driver operation. A vehicle brake lamp connected to the brake lamp switch is indicated at 112.

The line connection 25 to the transistor circuit enables lock-out of the operation of the throttle actuator D to take place and therefore disables the circuit A to a standby condition, the zener diode 22 and resistor 23 respectively assisting in switch-off and discharging the base of the transistor 20. The line connection 26 from the circuit B is to the error amplifier 18 of the circuit A to enable the error signal to be altered manually by the engage/advance switch 116, to cause an increase or "advance" in speed when required, by increasing the mark/space ratio of the pulses of the output signal Vn fed to the actuator 46. The line connection 27 from the circuit B is to the memory switch 13 of the circuit A to enable the memory to be updated when required. The remaining line connection 28 made from the circuit B to the circuit A is to the line 7 along which the speed responsive signal V is fed from the converter 6 and allows the alteration of V to a level equivalent to a low speed for storage in the memory at "switch on" of the system.

The control logic and safety circuit B provides the following peripheral facilities:

(a) speed responsive circuit lock-out to standby condition at supply switch-on, (b) memory cancel at supply switch-on, (c) low speed lock-out to standby condition, (d) engage speed control system and memorize cruise speed, (e) advance of cruise speed manually, (f) speed responsive circuit lock-out to standby condition when the vehicle is braked, and/or when neutral gear is engaged, and/or when the clutch is depressed, and/or when top gear is not selected, and/or manually, (g) resume previous cruise speed after lock-out other than that caused by supply switch-on, and (h) switch-off to standby when cruising.

Reference will now be made to the switch-on lock-out and memory cancel facilities (a), (b). A transistor 82 and its associated components provides the switch-on lock-out and memory cancel facilities. When the supply to the speed responsive system is switched off, all capacitors are discharged. When the car supply is switched-on, a capacitor 96 charges quickly from the low impedance supply V+ through resistor 32, but a capacitor 90 has to charge via a resistor 86, which has a relatively high resistance. The capacitor 90 therefore draws current through the base emitter junction of the transistor 82 causing it to switch-on for a period of time say 200 mS determined by the time constant of capacitor 90, and resistor 86. A resistor 84 discharges any transistor base charge and completes the charging of the capacitor 90 after the switch-on period has ended.

During the switch-on period the anodes of diodes 78, 76 and 74 are pulled up to V+ by transistor 82. The diode 78 pulls up one input of a NOR gate 52 setting a bistable, formed by NOR gates 56 and 58, via NAND gate 54, so that the output of the NOR gate 56 is at zero volts. This pulls down line connection 25 to 0V via a diode 94 and locks out the drive signal Vn holding the circuit A in the standby condition.

The diode 76 is connected via a resistor 80, a line 81 and the line connection 28 to line 7 of circuit A and during the switch on-period holds the speed responsive signal V in line 7 at a value which is equivalent to a low speed, usually at or below the low speed lockout. The diode 74 is connected to the memory circuit switch 13 of circuit A through line 27 and operates this switch during the switch-on period so that the low speed held by diode 76 is stored by the memory circuit. For reasons of safety this happens whether the supply is switched on with the vehicle stationary or moving at a low or very high speed. In addition capacitors 47, 48, 50 in conjunction with another capacitor 138 are arranged to charge from the supply rails 29 and 30 in such a manner that the logic of circuit B tends to set to the standby condition at switch-on. These capacitors then act in conjunction with resistors 130, 132, 134 and 128 to decouple the logic input switch lines 103, 105, 107 and 101. This protects the inputs from damage due to interference pulses and overloads. Resistors 40, 42, 44 and 136 pull the logic inputs to the correct logic levels in the quiescent state.

The low-speed lock-out facility (c) will now be described. A comparator C formed by an amplifier 124 and resistors 120, 122, 123 and 126 compares the speed responsive signal V fed through line 28 with a level derived, in this case, from the V+ supply rail 29 via the resistors 122 and 123. If the speed responsive signal V is indicative of the vehicle travelling at a speed which is less than a certain speed say 20 mph the comparator output is fed to another input of the NOR gate 52 which then sets the bistable formed by NOR gates 56 and 58 via NAND gate 54 so that the output of NOR gate 56 is at zero volts, thereby pulling down the line connection 25 via diode 94 and locking out the drive signal. The comparator output also inhibits a NOR gate 62 to prevent the vehicle speed being advanced and engagement of the system. The resistor 126 provides switch point hysteresis if required. This facility is again a safety feature to prevent engagement under what could be dangerous circumstances in low speed traffic, and to guard against loss of speed input signal due to failure of the inductive transducer 4 or other pick-up associated with a rotatable member.

Referring to the engage speed responsive system and memorize cruise speed facility (d), once the V+ supply is switched on and a cruise speed has been attained, the engage/advance switch 116 may be momentarily set to the engage position. A NAND gate 60 will then cause a capacitor 66 to form a pulse which will trip the bistable 56, 58 so that the output from the NOR gate 56 is at V+. This back biases the diode 94 allowing the output drive signal Vn to reach the solenoid 46. For the short duration that the switch 116 is closed in the engage position, the output of the NOR gate 62 is held to V+ via one input connected to the line 105 and switches on the memory circuit switch via a diode 72 and the line connection 27, causing the memory circuit to store a signal equivalent to the cruise speed.

With reference to the advance cruise speed facility (e); if in facility (d) the switch 116 is held for any period of time in the engage position, then since the output of the NOR gate 62 is at V+, the output of a NAND gate 64 will be at zero volts. This causes a diode 92 to conduct, which via resistor 88 and the line connection 26 causes the error amplifier 18 in the circuit A to emit a signal which results in a drive signal Vn causing vehicle throttle opening and the vehicle speed being increased. The value of the resistor 88 may be chosen to obtain the required degree of acceleration in the "advance" mode to suit the engine capacity or power weight ratio of the vehicle.

Turning now to the speed responsive circuit lock-out facility (f), normally the vehicle footbrake lamp switch 110 is used to lock-out the system drive signal when it is required to return to normal throttle control of vehicle speed. When the brake lamp-switch 110 is operated one input of the NOR gate 52 is pulled up to V+ setting the circuit A to the standby condition, exactly as by the diode 78 with the facilities (a) and (b).

An additional lock-out input is provided for safety purposes. This allows the system to be reset to the standby condition by operating a switch 114 causing the NAND gate 54 to set the bistable formed by NOR gates 54 and 56 and thus lock-out of the drive signal Vn as with the facilities (a) and (b). The switch 114 connects the input of NOR gate 54 to the zero volt rail 30 via a diode 115. On vehicles fitted with an automatic gearbox, switch 114 is the neutral gear position over-ride switch to prevent damage to the engine in case of inadvertent selection of neutral whilst in the cruise condition. On vehicles fitted with a manual gearbox, the switch 114 may be operated by the clutch to lock-out the system when the engine is de-clutched. An alternative is to confine the use of the system to top gear by fitting a switch which is open circuit only when the gearbox is set to the top gear position. Another use of this input is for manually locking out the system. This may be accomplished by providing an extra position, for example a push-button 117, on the engage/advance/resume/off switch(es) 116, and connecting it to the neutral over-ride input by a diode 119 and a line 100. Where the supply for the system is taken from the switched ignition line on a vehicle, but the brake lamps are not connected to the same point and have a separate fuse, extra protection may be required to guard against fuse blowing. In this event no brake over-ride signal would be available. The addition of a resistor 98 and a diode 99 however allows the over-ride input to be pulled down to zero volts so locking out the speed responsive system in the event of supply failure to the brake lamp circuit. In the event of the logic input line 101 constituting the brake over-ride wire failing or the brake lamp failing, the over-ride input which is connected to the +14V connection 35 is pulled up to this voltage thereby setting the system to standby.

The resume of previous cruise speed facility (g) will now be described. Since the memory circuit is only engaged when the "engage advance" input is pulled low, any speed responsive signal is memorized until the system is reengaged. If the "resume" input is pulled low the bistable 56, 58 is changed over via the other input of the NAND gate 60 from input line 107, the pulse forming circuit capacitor 66 and resistor 70. This locks the system in without disturbing the memory circuit. If the driver of the vehicle now removes his foot from the throttle, the vehicle will decelerate, or be accelerated, until the previous cruise speed is restored.

An important feature is that the "engage" and "resume" switches initiate a pulse to operate the control logic, whilst the lock-out facilities are direct coupled. This gives a safety advantage in that even if the engage and/or resume switches become shorted to the "on" condition, due to failure or some component, once the system has been over-ridden and locked out it will stay so.

The switch-off to standby when cruising facility (h) can be accomplished using the resume position of switch 116 by means of a diode 140, a resistor 141 and a capacitor 142. The capacitor 142 is normally at V+ being charged via resistor 141 and resistor 44 from the supply rail 29. When "resume" is switched the system resumes immediately from off. If the system is on and "resume" is pressed and held, the capacitor 142 discharges via the resistor 141 until the neutral over-ride input in line 103 is pulled down via the diode 140 after a short interval, say half a second, and locks the system to standby.

Another way of using the resume position to accomplish facility (h) and which gives immediate switch-off to standby will now be described. When the system is on, one input of a NAND gate 143 is held at V+ by the output of the bistable formed by the NOR gates 56, 58 via a resistor 144. If the resume switch 116 is operated the pulse from capacitor 66 appears at the other input of the NAND gate 143 so that its output goes to 0 volt pulling down the neutral over-ride input 103 of NAND gate 54 via a diode 145. The bistable 56, 58 flips off thereby putting the system to standby. A capacitor 146 in conjunction with the resistor 144 holds the first mentioned input of the NAND gate 143 at V+ for a short time to allow the bistable 56, 58 to flip. The NAND gate 64 holds the first mentioned input of NAND gate 143 down via a diode 147 when the engage switch 116 is pressed but operation of the engage switch can also be used to cause lock-out by omitting the diode 147. The omission of diode 147 means that whatever position the switch 116 is pressed into when the system is on, i.e. "engage," "resume," or an off position when switch 117 is combined with switch 116, will cause lock-out of the system to standby, thus providing an additional safety factor.

Various modifications may be made without departing from the scope of the invention. For example, the speed responsive circuit A which is as described in our U.S. Pat. No. 3,983,954 may be replaced by the speed responsive circuit described in our U.S. Pat. No. 3,767,972, and the control logic and safety circuit may be adapted to operate therewith.

What is claimed is:

1. In an electronic speed responsive system for a motor vehicle, including a speed responsive circuit having means for generating a first voltage proportional to an actual speed of the vehicle, memory means for memorising a desired cruise speed and for producing a reference voltage representing the desired cruise speed stored in the memory means, comparator means for comparing said first voltage with said reference voltage to produce an output error signal related to the difference between said first voltage and said reference voltage, and electronic control circuitry for rendering the speed responsive circuit operative and inoperative, the improvement which comprises a control logic and safety circuit constituting said electronic control circuitry and incorporating memory cancel means for cancelling the previously memorised cruise speed stored in the memory means before each new journey of the vehicle, said memory cancel means being connected to driver-operated means for making an action associated with at least one of bringing the vehicle into, and driving the vehicle from, a parked condition.

2. A system as claimed in claim 1, wherein the driver-operated means is constituted by a vehicle supply switch which operates the memory cancel means on supply switch-on.

3. A system as claimed in claim 1, wherein the driver-operated means is constituted by a vehicle supply switch which operates the memory cancel means on supply switch-off.

4. A system as claimed in claim 1, wherein the driver operated means is a vehicle hand-brake which renders the memory cancel means operative upon application of the hand-brake.

5. A system as claimed in claim 1, wherein the driver operated means is a vehicle hand-brake which renders the memory cancel means operative upon release of the hand-brake.

6. A system as claimed in claim 1, wherein the control logic and safety circuit includes means for locking out the speed responsive circuit to a standby condition, said lock-out means being direct coupled to the speed responsive circuit, first switch means connected to control logic elements of said control logic and safety circuit for momentary operation to cause engagement of said speed responsive circuit and memorising of the vehicle cruise speed and for prolonged operation to cause an increase of the vehicle speed and simultaneous up-dating of the memory voltage, and second switch means connected to control logic elements of said control logic and safety circuit for switching-off the speed responsive circuit when the speed responsive circuit is engaged and for causing the speed responsive circuit to resume operation at the previously memorised cruised speed when the speed responsive circuit is in a disengaged state.

7. A system as claimed in claim 6, wherein the control logic and safety circuit includes means connected to vehicle supply switching means for locking-out the speed responsive circuit to a standby condition as well as for cancelling the memorised cruise speed, at supply switch-on.

8. A system as claimed in claim 6, for a vehicle with a manual gearbox, wherein the control logic and safety circuit includes at least one of a clutch-operated switch means and a neutral gear-operated switch means, the switch means being connected to said lock-out means through control logic elements of the control logic and safety circuit, whereby to over-ride the speed responsive circuit even if an engaging signal is permanently applied thereto.

9. A system as claimed in claim 1, for a vehicle with a manual gearbox, wherein the control logic and safety circuit includes means for locking-out the speed responsive circuit to a standby condition, said lock-out means being direct coupled to said speed responsive circuit and at least one of a clutch-operated switch means and a neutral gear-operated switch means connected to said lock-out means through control logic elements of the control logic and safety circuit, whereby to over-ride the speed responsive circuit even if an engaging signal is permanently applied thereto.

10. A system as claimed in claim 1, wherein the control logic and safety circuit includes means for locking-out the speed responsive circuit to a standby condition, said lock-out means being direct coupled to said speed responsive circuit, and a driver-operated multi-position switch each position of which is connected through a respective logic input to respective logic elements of the control logic and safety circuit, whereby in each of said positions when the speed responsive system is on, the switch causes the system to be switched off to a standby condition, and whereby, the switch causes in one of its positions engagement of the speed control circuit, memorising of the vehicle cruise speed, and advance of said cruise speed if held; and in another of its positions, when the speed responsive system is off, causes the speed responsive circuit to resume operation at the previously memorised cruise speed.

11. A system as claimed in claim 1, wherein the control logic and safety circuit includes means for locking-out the speed responsive circuit to a standby condition connected through logic elements of the control logic and safety circuit and a logic input line to a brake lamp circuit including a brake lamp and a brake lamp switch for over-riding the speed responsive circuit and setting it to standby on operation of the vehicle brakes, the control logic and safety circuit further including means connected to said lock-out means and being responsive to at least one of supply failure to the brake lamp circuit, failure of said logic input line and failure of said brake lamp to over-ride the speed responsive circuit and set it to standby.

12. A system as claimed in claim 7, wherein the speed responsive circuit includes means for generating a second voltage which is dependent upon the rate of change of the first voltage and connected to an input of said comparator means which combines the first and second voltages with the reference voltage to change the output error signal in dependence upon the relative magnitude of said first voltage, said second voltage and said reference voltage, means for generating a periodic voltage of constant frequency, and second comparator means for comparing the output error signal with said periodic voltage to produce at the output of said second comparator means a train of pulses of constant frequency and of a width varying with relative magnitude of said first voltage, said second voltage, and reference voltage, and wherein the switch-on lock-out and memory cancel means includes a transistor which is connected to a time constant circuit and which is turned on for a period determined by the time constant circuit, a bistable device controlled by said transistor during said turn-on period and for locking-out the output signal from said second comparator means, and a diode device operated by said transistor whereby to hold said first voltage at a value equivalent to a predetermined low speed and store said predetermined low speed in said memory means.

* * * * *